(12) United States Patent
Frietsch et al.

(10) Patent No.: US 7,634,671 B2
(45) Date of Patent: Dec. 15, 2009

(54) DETERMINING POWER CONSUMPTION IN IT NETWORKS

(75) Inventors: Thomas Frietsch, Sindelfingen (DE); Thomas Trenz, Ehningen (DE)

(73) Assignee: Hewlett-Packard Development Company, L.P., Houston, TX (US)

( * ) Notice: Subject to any disclaimer, the term of this patent is extended or adjusted under 35 U.S.C. 154(b) by 537 days.

(21) Appl. No.: 11/492,963

(22) Filed: Jul. 26, 2006

(65) Prior Publication Data

US 2007/0094527 A1 Apr. 26, 2007

(30) Foreign Application Priority Data

Oct. 20, 2005 (EP) .................. 05109807

(51) Int. Cl.
G06F 1/00 (2006.01)
G06F 1/26 (2006.01)
(52) U.S. Cl. .................. 713/300; 713/310; 713/320
(58) Field of Classification Search ................. 713/300, 713/340
See application file for complete search history.

(56) References Cited

U.S. PATENT DOCUMENTS

| | | | |
|---|---|---|---|
| 6,014,697 A * | 1/2000 | Lewis et al. .................. 709/223 |
| 6,836,737 B2 | 12/2004 | Petite et al. |
| 6,928,564 B2 * | 8/2005 | Tada et al. .................. 713/321 |
| 2002/0194180 A1 | 12/2002 | Alsop |
| 2003/0005339 A1 * | 1/2003 | Cohen et al. ................. 713/300 |
| 2004/0167732 A1 | 8/2004 | Spitaels |
| 2005/0003889 A1 | 1/2005 | Dabrowski |
| 2005/0075839 A1 | 4/2005 | Rotheroe |
| 2005/0289371 A1 * | 12/2005 | Makiyama et al. .......... 713/300 |
| 2008/0288794 A1 * | 11/2008 | Randall et al. .............. 713/310 |

OTHER PUBLICATIONS

European Search Report for EP Application No. 05109807.7-2224 received on Jun. 15, 2006.

* cited by examiner

Primary Examiner—Nitin C Patel

(57) ABSTRACT

A method is provided of determining total electric power consumption of a managed IT network including network devices having a management-addressable address. An auto-discovery tool is run to discover the network devices of the managed IT network. Management requests are directed to the management-addressable addresses of the network devices to obtain the electric power consumption values of the network devices. The electric power consumption values returned by the network devices are centrally collected, and the total electric power consumption of the managed IT network is calculated by adding the electric power consumption values of the network devices.

11 Claims, 12 Drawing Sheets

|  | DEVICE 24 | MANUFACTURER 25 | DATE 26 | TIME 27 | CURRENT ELEC. POW. CONS. 21 |
|---|---|---|---|---|---|
| SERVERS 3.1-3.5 | 01012378 | CISCO | 09/28/05 | 17:15 | 510 W |
| | 12452342 | CISCO | 09/28/05 | 17:15 | 480 W |
| | 01220078 | HEWLETT-PACKARD | 09/28/05 | 17:10 | 639 W |
| | 24356000 | DELL | 09/28/05 | 17:00 | 758 W |
| | 10045701 | HEWLETT-PACKARD | 09/28/05 | 17:00 | 338 W |
| INTERCONNECT DEVICES 4.1-4.5 | 20747821 | HEWLETT-PACKARD | 09/28/05 | 17:50 | 139 W |
| | 12375400 | CISCO | 09/28/05 | 16:45 | 97 W |
| | 00123498 | CISCO | 09/28/05 | 16:30 | 68 W |
| | 10023479 | CISCO | 09/28/05 | 16:40 | 75 W |
| | 98760154 | CISCO | 09/28/05 | 16:30 | 102 W |

SNMP-QUERYABLE MANAGEMENT INFORMATION 10

*FIG. 3*

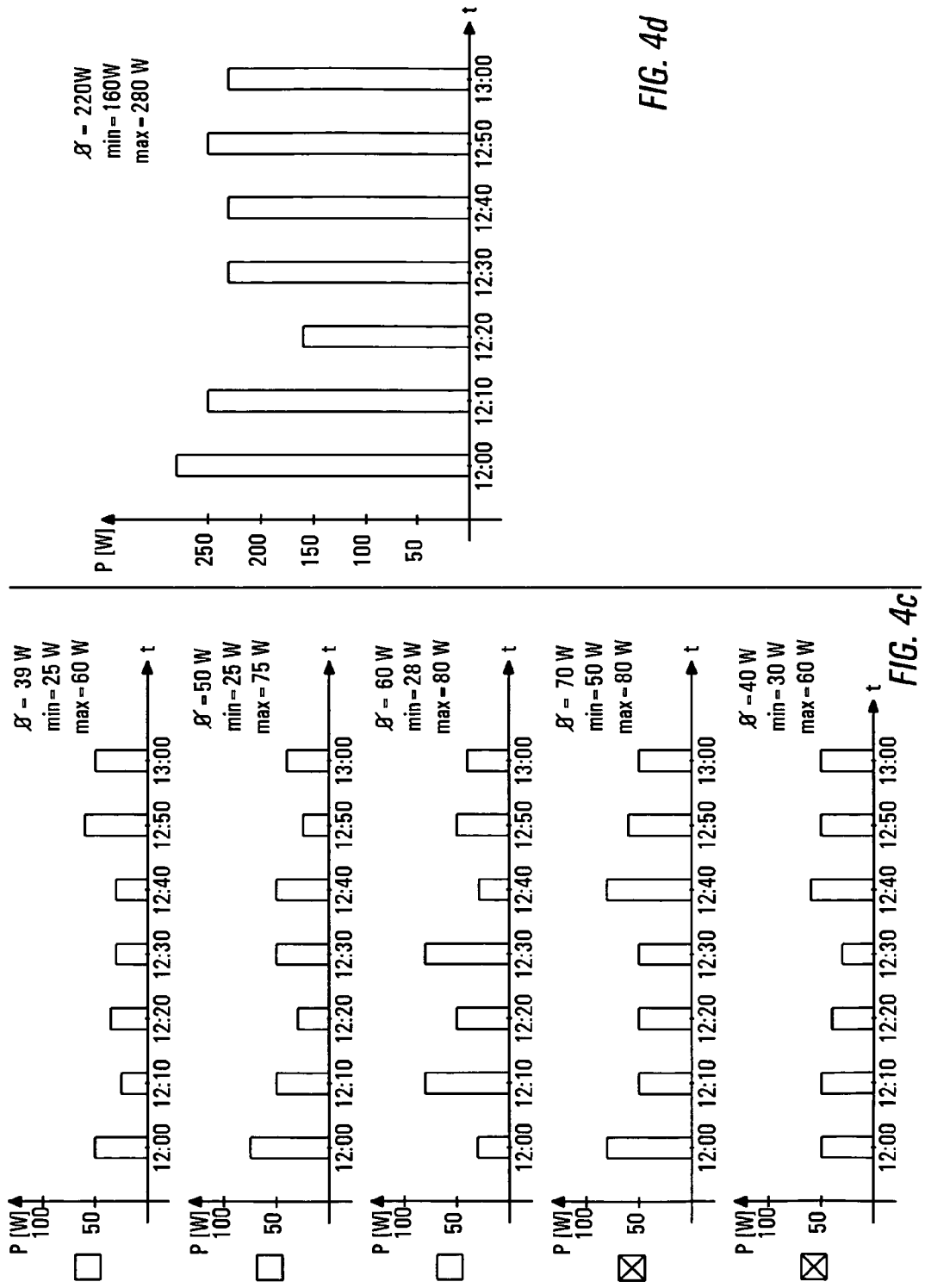

| COMPONENT ID 24 | MANUFACTURER 25 | NOMINAL ELECTRIC POWER CONSUMPTION 22 |
|---|---|---|
| 89071255 | CISCO | 800 W |
| 54321000 | HEWLETT-PACKARD | 780 W |
| 73512354 | CISCO | 770 W |
| 10023146 | CISCO | 650 W |
| 65120013 | HEWLETT-PACKARD | 400 W |
| 53136678 | HEWLETT-PACKARD | 150 W |
| 94567154 | CISCO | 100 W |
| 10765123 | CISCO | 130 W |
| 01254578 | CISCO | 140 W |
| 17891235 | CISCO | 145 W |

Rows 1–5: SERVERS 3.1-3.5
Rows 6–10: INTERCONNECT DEVICES 4.1-4.5

SNMP-QUERYABLE MANAGEMENT INFORMATION 10

FIG. 6

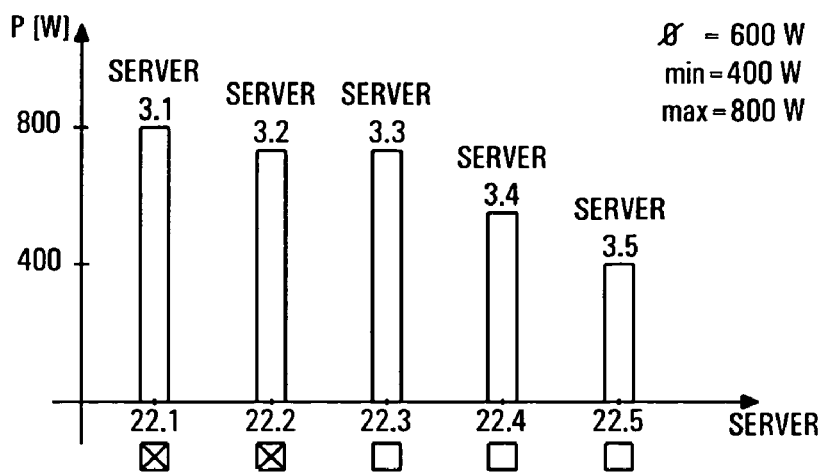
*FIG. 7a*
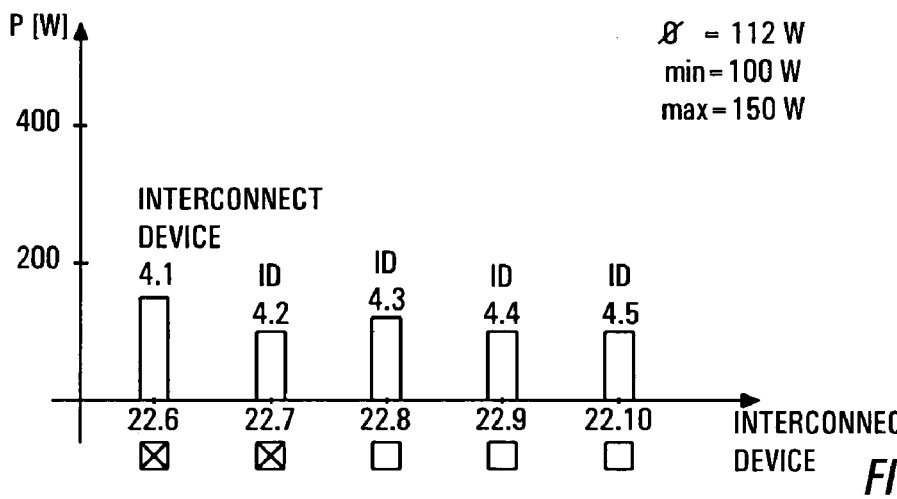
*FIG. 7b*
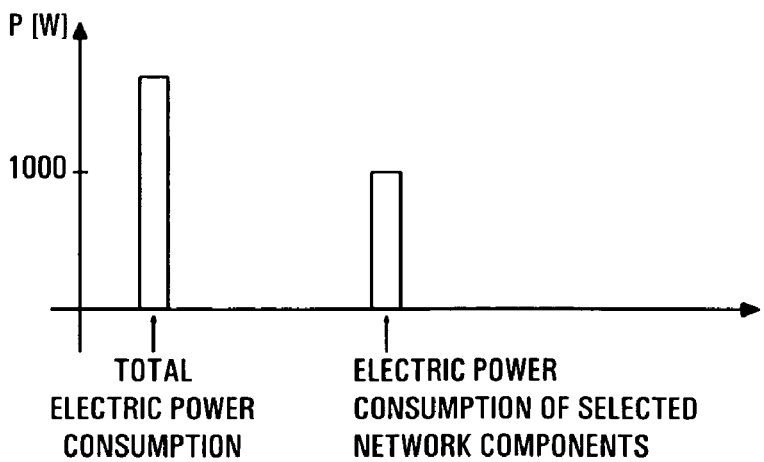
*FIG. 7c*
*FIG. 7*

DETERMINING POWER CONSUMPTION IN IT NETWORKS

RELATED APPLICATIONS

The present application is based on, and claims priority from, European Application Number 05109807.7, filed Oct. 20, 2005, the disclosure of which is hereby incorporated by reference herein in its entirety.

FIELD OF THE INVENTION

The present invention relates generally to electric power consumption determination in information technological (IT) networks, and for example, to methods, computer systems and computer program products for determining electric power consumption of network devices of an IT network.

BACKGROUND OF THE INVENTION

The planning and management of data centers is a complex task which involves various aspects that have to be considered. Primarily, the storage capacity and the computing power of a data center has to be planned in such a way that the data center is capable of fulfilling its requirements. Therefore, appropriate network devices such as servers, specially designed storage devices and interconnect devices (routers, switches, hubs, etc.) which constitute the data center should be selected prudently. After the data center has been put into operation, the data center may be managed by administrators supported by network management platforms such as Hewlett Packard's OpenView. A network management platform is typically capable of querying management information (type of device, manufacturer, status: up or down) of the individual network devices, analyzing the queried data and providing a real-time monitoring of the functioning of the network devices based on the analysis of the queried management information.

The planning and management of data centers are interrelated in that a well conceived data center is less error-prone and needs less supervision by human data center administrators. Moreover, the costs of the data center personnel, lease rental charges of the floor space occupied by the network devices, electric power consumption of the network devices and some other sizes—commonly subsumed under the term "maintenance costs"—may be cut.

In this context, curbing the electric power consumption of a data center is important, for example, since it correlates with the heat radiated by the network devices. Therefore, if the electric power consumption is high, the air conditioning system of the data center also needs more electric power to cool the ambient temperature down and keep it below a threshold in order to prevent the network devices from breaking down as a result of overheating.

At present, the electric power consumption of the network devices of a data center is normally not a constant value and in the future, the electric power consumption of a data center will be subject to even more variations since next-generation network devices will increasingly make use of on-demand computing features or will dynamically power down non-utilized devices such as CPU's and hard disks.

In one approach to determining the electric power consumption of a data center (i.e. the total electric power consumption of all network devices), the data center personnel manually creates an inventory of all data center equipment and calculates the total amount of power consumption of all devices. This approach is both labor intensive and error-prone. Furthermore, since network devices may be added to or removed from the data center, the electric power consumption of the data center thus determined may only be valid for a short period of time.

In U.S. Pat. No. 6,836,737, a plurality of power meters may be monitored remotely by a host computer. The electric power meters are configured to measure the electric power consumption of loads attached to them. In this context, a load is typically one or several electricity-consuming devices belonging to a household. The electric power meters send their measured data via transceivers connected to a WAN (wide area network) to the host device which evaluates the data. Each power meter needs its own address in order to be queryable via a network communication protocol.

Another system which enables polling of electric power consumption of network devices is "Power over Ethernet". This technology pertains to a system that transmits electrical power, in addition to data, to remote devices over standard twisted-pair wire in an Ethernet network. This technology is useful for powering IP telephones, wireless LAN access points, webcams, hubs, and other appliances where it would be inconvenient or infeasible to supply power separately. The Power over Ethernet technology was originally developed and first delivered by Cisco to support IP telephony. Telephones are connected to Cisco switches and the Cisco Discovery Protocol (CDP), a network protocol acting on OSI Layer 2, is provided which is used by Cisco routers to obtain protocol addresses of nearby devices. The electric power consumption of the telephones connected to a switch may be queried by a network management application.

SUMMARY OF THE INVENTION

A method is provided of determining total electric power consumption of a managed IT network including network devices having a management-addressable address. An autodiscovery tool is run to discover the network devices of the managed IT network. Management requests are directed to the management-addressable addresses of the network devices to obtain the electric power consumption values of the network devices. The electric power consumption values returned by the network devices are centrally collected. The total electric power consumption of the managed IT network is calculated by adding the electric power consumption values of the network devices.

According to another aspect, a computer system is provided for determining total electric power consumption of a managed IT network including network devices having a management-addressable address. The computer system is programmed to run an autodiscovery tool to discover the network devices of the managed IT network. Management requests are directed to the management-addressable addresses of the network devices to obtain the electric power consumption values of the network devices. The electric power consumption values returned by the network devices are centrally collected. The total electric power consumption of the managed IT network is calculated by adding the electric power consumption values of the network devices.

According to another aspect, a computer program product is provided which is either in the form of a machine-readable medium with program code stored on it, or in the form of a propagated signal including a representation of program code. The program code is arranged to carry out a method, when executed on a computer system, of determining total electric power consumption of a managed IT network including network devices having a management-addressable address. An autodiscovery tool is run to discover the network devices of the managed IT network. Management requests are directed to the management-addressable addresses of the network devices to obtain the electric power consumption values of the network devices. The electric power consumption values returned by the network devices are centrally collected. The total electric power consumption of the managed IT network is calculated by adding the electric power consumption values of the network devices.

Other features are inherent in the methods, systems and products disclosed or will become apparent to those skilled in the art from the following detailed description of the embodiments and its accompanying drawings.

BRIEF DESCRIPTION OF THE DRAWINGS

Embodiments of the invention will now be described, by way of example, and with reference to the accompanying drawings, in which:

FIG. 3 shows an exemplary relational data table as part of the relational data model, according to embodiments of the invention;

FIGS. 4a-f illustrate several evaluations of collected current electric power consumption data, in accordance with embodiments of the invention;

FIG. 6 shows a relational data table containing nominal electric power Consumption values;

FIGS. 7 and 7a-7c show an evaluation of collected nominal electric power consumption data, according to embodiments of the invention;

The drawings and the description of the drawings are of embodiments of the invention and not of the invention itself.

DESCRIPTION OF THE PREFERRED EMBODIMENTS

Figure 1:
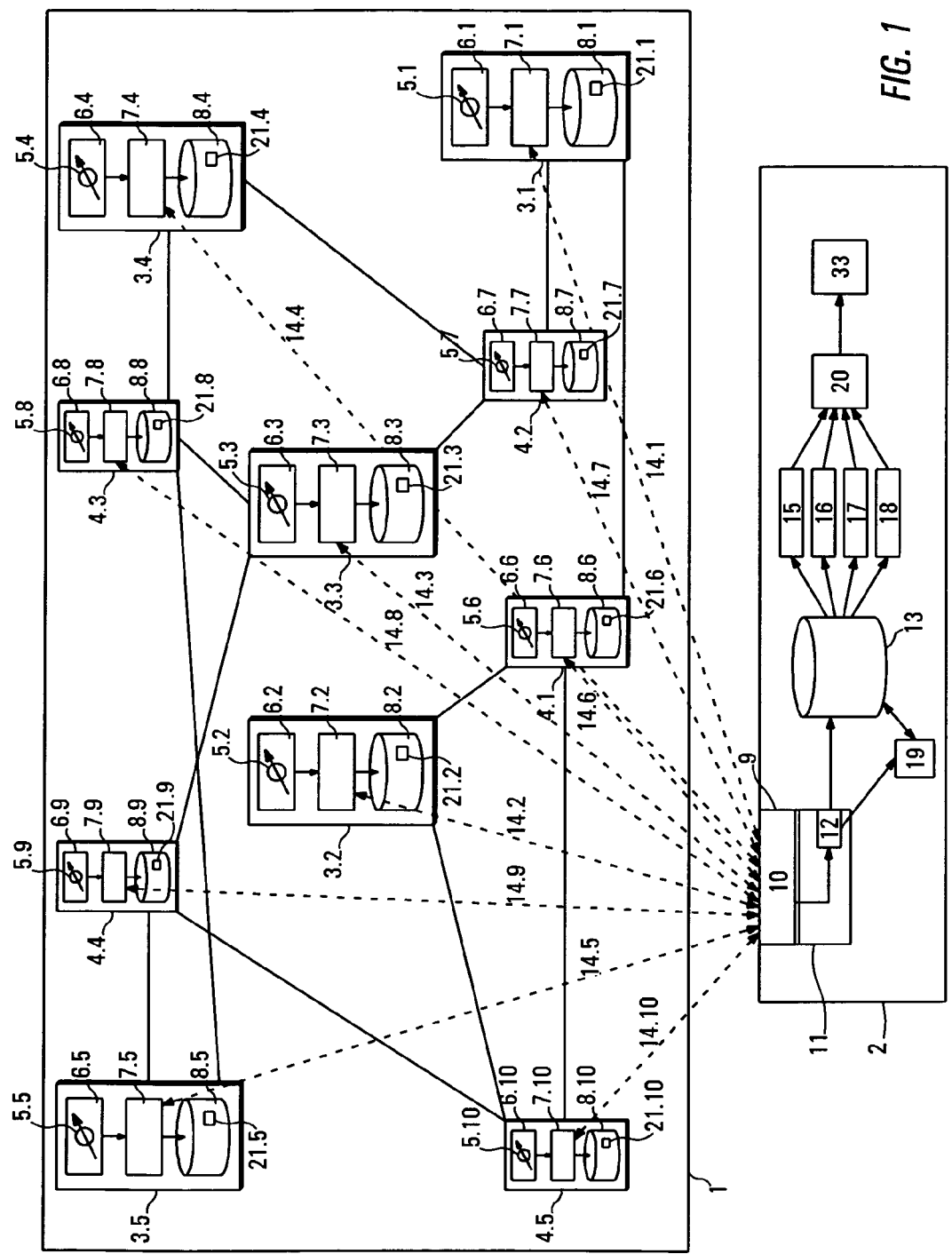
FIG. 1 is a high-level architecture of an exemplary management station and an exemplary IT network for determining current electric power consumptions, according to embodiments of the invention.

FIG. 1 is a high-level architecture diagram of an exemplary management system and an exemplary IT network. By means of FIG. 1, an embodiment of a network device being arranged to divulge its own electric power consumption value and a method of determining total electric power consumption of the IT network will be explained. However, before proceeding further with the description of FIG. 1, a few items of the embodiments will be discussed.

In some of the embodiments, total electric power consumption of a managed IT network including network devices having a management-addressable address is determined. An autodiscovery tool is run to discover the network devices of the managed IT network. Management requests are directed to the management-addressable addresses of the network devices to obtain the electric power consumption values of the network devices. The electric power consumption values returned by the network devices are centrally collected, and the total electric power consumption of the managed IT network is calculated by adding the electric power consumption values of the network devices.

An IT network features network devices, namely servers and interconnect devices, such as switches, bridges, hubs, and repeaters, which connect the servers among each other. However, since nowadays, for example printers, laptops, PC's and scanners also have a management-addressable IP address, these devices are also subsumed under the term "IT network device". Therefore the term "IT network device" as used herein refers to all sort of device coupled to an IT network which is manageable via IP.

In some of the embodiments, an IT network relates to network devices of a non-public network (intranet) of an enterprise or organization, whereas in other embodiments, an IT network relates to a telecommunications network. Typically, the network devices of an IT network are centralized in one room or building which is called a data center. An IT network is preferably, but not necessarily, a TCP/IP network in which the devices run the TCP/IP protocol suite, have an IP address and can send IP packets to all other devices. In some of the embodiments, the management-addressable address is an IP address used for management purposes.

In some of the embodiments, an IT network is monitored and managed by a management station and is therefore also referred to as a "managed IT network". The devices of the IT network have management-addressable IP addresses so that they are accessible via a network management protocol. Typically, but not necessarily, the network devices are addressable via SNMP (Simple Network Management Protocol) which allows management information to be requested from the individual network devices. In order to monitor a given IT network, data pertaining to the IT network (i.e. management information of servers and interconnect devices) is collected. Typically, the data pertaining to the IT network is automatically gathered by using an autodiscovery tool which is less laborious than having the data collected by employees of the company or organization. The term "autodiscovery", as used herein, relates to the collecting of queryable management information stored in the network devices of the IT network and centrally storing it in tables of a database (typically based upon a relational data model) of a management platform. Thereby, a representation of the IT network is generated which also reflects the connections among the network components so that a map of the IT network may be built. The latter function is also referred to as "autotopology function".

In some of the embodiments, autodiscovery tools query management information of the network devices via SNMP which stands for Simple Network Management Protocol and is a protocol from the TPC/IP protocol suite acting on the Application Layer. However, autodiscovery may also be performed by means of another network management protocol or without any protocol but by means of a different methodology.

In other embodiments, the management information of network devices is queried via the Common Management Interface Protocol (CMIP) which defines communication between network management applications (which centrally collect management information from the managed IT network devices) and management agents (which locally provide the management information on the managed IT network devices). CMIP is based on the Open Systems Interconnection (OSI) model and is part of the ITU-T X.700 series of recommendations. Furthermore, CMIP defines management information in terms of managed objects and allows both modification and the performance of actions on the managed objects. Managed objects are described using GDMO (generic definition of managed objects) and are identified by a distinguished name (DN). CMIP also complies with advanced security standards (support authorization, access control, and security logs) and flexible reporting of unusual network conditions. CMIP was designed to replace SNMP, and is superior to it in various aspects. CMIP was to be a key part of the Telecommunications Management Network vision, and was to enable cross-organizational as well as cross-vendor network management. On the Internet, however, most TCP/IP devices support SNMP and not CMIP. This is because of the complexity and resource requirements of CMIP agents and management systems. CMIP is supported mainly by telecommunication devices and is defined in RFC 1095 and 1189 (The Common Management Information Services and Protocols for the Internet).

In some of the embodiments, the querying of management information from a network device is performed on a DMI (Desktop Management Interface)-based management architecture. DMI provides a standard framework for the management and control of desktop PC's, notebooks and servers. DMI encompasses a definition of an information model, the so-called management information format (MIF), which is used for specifying system configuration information.

In other embodiments, determining total electric power consumption of an IT network is performed on a WMI (Windows Management Instrumentation)-based management architecture. WMI is a set of extensions to the Windows Driver Model. WMI provides an operating system interface through which instrumented devices provide information and notification. WMI is Microsoft's implementation of the Web-Based Enterprise Management (WBEM) Standard from the Distributed Management Task Force (DMTF). WMI allows scripting languages like VBScript to manage Windows PCs and servers, both locally and remotely.

In yet other embodiments, an open-source implementation of the WBEM standard is used, which is called OpenPegasus. It is designed to be portable and highly modular. OpenPegasus runs today on most versions of Unix, Linux, and AIX.

Since SNMP, which is the most common management protocol, is part of the TCP/IP protocol suite, only management information of network devices featuring an IP address may be queried. However, it should be mentioned that interconnect devices such as hubs and repeaters typically do not have an IP address so that their management information is not accessible via SNMP. (Incidentally, nowadays, switches are preferred to hubs for performance reasons. Furthermore, switches became budget-priced over the last years.) For the sake of simplicity, it is therefore assumed that the interconnect devices considered below all have an IP address and are therefore addressable via SNMP.

In the individual network devices of the IT network, the queryable management information is stored in management information bases. Queryable management information is also referred to as "managed objects", whereby the term "object" does not imply that the information is organized in an object-oriented way. The term "management information base" is closely related to the SNMP protocol which is based on an architecture in which an SNMP manager sends requests to an SNMP agent. The agent, in turn, has access to a management information base in which SNMP-queryable management information is stored. The management information bases in the context of SNMP are organized in a standardized structure, which is commonly referred to as "MIB data structure" or as "Internet registration tree" (see for example: Hegering, H.-G., Abeck, S., Neumair, B. "Integrated Management of Networked Systems: Concepts, Architectures, and Their Operational Application", p. 161, Morgan Kaufmann Publishers, 1999). It should be mentioned that the term "management information base", as used herein, is not only used in this SNMP-specific meaning, but also in a broader sense relating to collections of management information within other management architectures such as CMIP, DMI or WMI. In general, a management information base is any kind of data collection associated with a network device in which queryable management information pertaining to the network device is stored.

In some of the embodiments, the network device's own electric power consumption is part of the management information which is stored in the management information base of each network device and is therefore queryable. Since the standardized management information base data structures (such as the Internet registration tree) do not a priori provide a directory in which the electric power consumption of a network device may be deposited, the management information base data structures have to be extended in that they enable storing the electric power consumption of an associated network device.

In some of the embodiments, an extension of the management information base data structure may be achieved by a standardization process or by requesting a directory at the IANA (Internet Assigned Numbers Authority).

Basically, the electric power consumption of a network device is composed of the electric power consumption of its constituent parts, such as hard-disk drive, DVD drive, memory, mainboard, graphics card, sound card, CPU, etc. and is not a constant value but underlies variations. The electric power consumption of a CPU, for example, depends on its clock frequency and also on the kind of operation that is currently performed.

In some of the embodiments, a network device is provided which returns the electric power consumption data stored in its management information base in response to a network management request directed to the device's IP address which aims to obtain the electric power consumption data of the network device.

In other embodiments, the network device is further equipped with a sensor for measuring the current electric power consumption of the network device. In the management information base of the network device, the current electric power consumption measured by the sensor is stored. A sensor for measuring electric power consumption is an electric power meter which is installed inside the power supply unit of the network device. The electric power meter is connected to an internal bus via which the measured electric power consumption values may be read. The measured electric power consumption values are updated on a regular basis in the management information base. Whenever a determination of the total electric power consumption of an IT network is initiated, the electric power consumption data which is currently stored in the management information base of each server is used as input for calculating the total electric power consumption.

In some of the embodiments, the network device's own electric power consumption value stored in the management information base is a nominal electric power consumption value. Nominal electric power consumption means that the electric power consumption has been determined once and is deposited in the management information base which is not updated during the runtime of the network device.

In some of the embodiments, the nominal electric power consumption of a network device is determined by the manufacturer of the network device. Whenever a management request is directed to the network device, the same nominal electric power consumption value is returned.

However, in some of the embodiments, the nominal electric power consumption of the device is not determined by the manufacturer. Rather, the network device features a sensor for measuring current electric power consumptions. At different points of time, determined by a user, the sensor measures the current electric power consumptions of the network device and calculates a nominal value, which is typically the geometric or arithmetic mean of the measured current electric power consumption values, and which is subsequently stored in the management information base as a nominal electric power consumption value.

In other embodiments, the total electric power consumption of the network devices of the entire IT network is calculated. To this end, the electric power consumption values of the individual network devices are required. Therefore, management requests which are intended to obtain the electric power consumption values of the network devices are directed to the IP addresses of the network devices. Subsequently, each network device returns its own electric power consumption value stored in its management information base. The electric power consumption values are collected at a central point and stored in a database. There, the total electric power consumption is calculated by adding the electric power consumption values of all network devices.

In some of the embodiments, the total electric power consumption of parts of an IT network is determined. First of all, management requests are directed to the IP addresses of the network devices of the IT network to obtain the electric power consumptions of the network devices. In response, the network devices return their own electric power consumption values stored in their management information bases. Then, the electric power consumption values of all network devices are collected at a central point. The user then selects those network devices forming the part of the managed IT network whose total electric power consumption s/he wishes to determine. After that, the total electric power consumption of the part of the network is determined by adding the electric power consumption values of the selected network devices. To determine the total electric power consumption of a managed IT network (or parts thereof), an autodiscovery tool is run on the managed IT network to identify the individual network devices (including some of the basic management information pertaining to the devices such as type of network device, manufacturer, processor, etc.) and to determine the topology of the managed IT network. The data collected by the autodiscovery tool is deposited in a database which is organized as a relational database scheme, encompassing tables with attributes storing data pertaining to the individual network devices. Furthermore, the autodiscovery database stores information about how the network devices are interconnected. The tables storing this information are typically referred to as topology tables. An example of a commercially available autodiscovery tool is "LAN Mapshot", a product by Fluke Networks, Everett Wash., USA. Methods in the realm of autodiscovery are disclosed in the patent application "Network server and method of discovery of a network node" US2005/003889 which deals with the discovery of a network node in response to being reconnected to a network.

In some of the embodiments, the electric power consumption of each device is a current electric power consumption measured by a sensor, whereas in other embodiments the electric power consumption is a nominal value.

In some of the embodiments, a nominal value is determined by storing a number of electric power consumption values measured by a sensor at different points of time. Subsequently, an average value, such as the geometric or arithmetic mean, is determined from the measured electric power consumption values and is inserted into the management information base.

In other embodiments, a nominal value is determined by the manufacturer of a device and stored in the management information base of the network device.

In some of the embodiments in which a sensor measures the current electric power consumption of its device, an alarm is triggered if a currently measured current electric power consumption value is outside a prescribed range of values since the fact that the electric power consumption of a network device is outside a range of values may be an indicator for the malfunctioning of the associated network device.

In order to get an evaluation of the total electric power consumption over a period of time, the total electric power consumption may be determined and stored on a regular basis at different points of time and may be statistically evaluated subsequently.

In some of the embodiments, the average total electric power consumption of the network device is calculated, whereas in other embodiments, the minimal or maximal electric power consumption of the network during the period of time is calculated. The data is stored in a data warehouse which is a sort of database typically used in conjunction with some analysis tools in which the gathered data may be evaluated. These evaluations may be the basis for predicting the electric power consumption of an IT network. A database, in general, is a collection of data, which belong together from the viewpoint of the user, e.g. a personnel database or an inventory database. There are hierarchical, relational, multi-dimensional and object-oriented databases. A database is usually administrated by a database management system (DBMS). A database system is a database in combination with a database management system. The term "database" as used hereinafter also relates to a data warehouse which is defined in many ways. According to Inmon W. H., a data warehouse is a subject-oriented, integrated, time-variant, non-volatile collection of data in support of management's decision-making process. Typically, a data warehouse integrates data coming from different sources and is connected to tools which enable reports, statistic data and performance figures to be compiled quickly. It therefore constitutes a vantage point for a variety of analytical tasks. A server database stores server-related data which may also be SNMP-queryable management information.

In some of the embodiments, determining the total electric power consumption of an IT network is based on the nominal electric power consumption of each network device which is typically determined by the manufacturer and inserted into the management information base of each network device. In other embodiments, determining the total electric power consumption of an IT network is also based on nominal electric power consumption values, which, in turn, are based on current electric power measurements which are measured by a sensor within each network device during an initial phase. After the measurement, the measured electric power consumption values are integrated into one nominal value (such as an average value) which is then stored in the management information base of each network device.

Some of the embodiments of the computer program product with program code for performing the described methods include any machine-readable medium that is capable of storing or encoding the program code. The term "machine-readable medium" shall accordingly be taken to include, for example, solid state memories and, removable and non removable, optical and magnetic storage media. In other embodiments, the computer-program product is in the form of a propagated signal comprising a representation of the program code, which is increasingly becoming the usual way to distribute software. The signal is, for example, carried on an electromagnetic wave, e.g. transmitted over a copper cable or through the air, or a light wave transmitted through an optical fiber. The program code may be machine code or another code which can be converted into machine code, such as source code in a multi-purpose programming language, e.g. C, C++, Java, C#, etc. The embodiments of a computer system may be commercially available general-purpose computers programmed with the program code.

FIG. 1: Architecture for Determining Current Electric Power Consumption

Returning now to FIG. 1, which illustrates the architecture of an IT network 1 which is managed by a network management station 2, which, in turn, is capable of determining the total electric power consumption of the entire IT network 1 or parts thereof. Basically, the IT network 1, as depicted in FIG. 1, includes two sorts of network devices, namely servers 3 and interconnect devices 4 which connect the servers 3. The interconnect devices 4 include routers, switches etc. and are managed, like the servers 3, by the network management station 2.

In the present exemplary embodiment, the network devices of the IT network 1 have a management-addressable IP address and are managed via SNMP which has become established as de facto standard protocol in the domain of Internet network management. SNMP is defined in RFC (Request for Comments) 1067 and is primarily based on two software entities, namely "SNMP agents" and "SNMP managers".

An SNMP agent 7 (referred to as "agent" hereinafter) is a program which constantly runs in the background on its associated managed IT network device and administrates an MIB 8 in which SNMP-queryable device-related management information 10, such as type of device, the name of the manufacturer, the location of the device, the electric power consumption etc. is stored. To provide this SNMP-queryable management information in the MIBs 8, SNMP agents 7 collect inter alia current electric power consumption values 21 of their associated network devices and deposit them in the MIBs 8 of the network devices on a regular basis. MIBs 8, which will be explained in more detail in FIGS. 2a and b, are essentially data collections which are organized in a widely branched directory tree (Internet registration tree), associated to each network device. Their purpose is to store SNMP-queryable device-related management information (in the present embodiment also including electric power consumption) about individual network devices which are administrated by an SNMP manager.

An SNMP manager, here represented in the form of a network management application 9 as part of the network management station 2, requests an agent 7 for any SNMP-queryable device-related management information deposited in the agent's 7 associated MIBs 8. Each branch of the Internet registration tree ends in a leaf that contains one item of management information pertaining to the network device, which means that the SNMP-queryable device-related management information 10 is only stored in the leaves of the Internet registration tree. Some of the SNMP-queryable management information 10, which is typically time-invariant, such as the name of the manufacturer of the network device is laid down once by the manufacturer of the network devices, whereas other SNMP-queryable device-related management information 10, such as current electric power consumption 21 is updated on a regular basis during the runtime of the network device by its associated agent 7. The agents 7 are responsible for collecting the current electric power consumption values 21 and inserting them into the MIBs 8 of the network devices. In the present embodiment, the agents 7 also record date and time (timestamp) at which the current electric power consumption values 21 have been measured by electric power meters 5.

Before determining the total electric power consumption of the IT network 1, an autodiscovery tool 11 is run on the IT network 1. The autodiscovery tool 11 discovers the individual network devices of the initially unknown IT network 1 in that it figures out basic network device identifying information (such as type of processor, name of manufacturer) of the devices of the IT network 1 by sending SNMP requests to the individual SNMP agents 7 located in the network devices. More specifically, the network management application 9, as part of the autodiscovery tool 11, sends SNMP requests to the individual network devices to query SNMP-queryable device-related information 10. The individual network devices return the requested information. The autodiscovery tool 11 is charged with inserting the returned information into a relational data model 12 which is a representation of the IT network 1. Furthermore, the autodiscovery tool 11 enables the topology of the IT network 1 to be determined. After the autodiscovery has been performed, the current electric power consumption values 21 are requested by the network management application 9 from the SNMP agents 7 of the network devices. The SNMP agents 7 have access to the MIBs 8, where the current electric power consumption values 21 are stored. The electric power consumption values 21 are measured within a power supply unit 6 which features an electric power meter 5 measuring the current electric power consumption 21 which is gathered by the associated agent 7 and deposited on a regular basis in an appropriate leaf of the Internet registration tree of each network device. From a hardware point of view, the current electric power consumption values 21 measured by the electric power meter 5 should therefore be readable via any of the network device's bus systems, such as PCI (peripheral device interconnect: a bus standard for connecting peripheral devices with the central processing unit). Alternatively, the electric power meters 5 could be implemented as USB (universal serial bus) devices which enable the electric power meters 5 to be plugged into the network devices' power cord which is attached to the device's universal serial bus. In other embodiments, the electric power meters 5 are implemented as mainboard devices. Furthermore, a device driver is needed for reading values from the electric power meters 5 and translating these into the standardized power measurement unit "Watt".

The agents 7 of all network devices are in contact via SNMP connections 14 with the network management application 9 which centrally collects the current electric power consumption values 21 associated to each network device and deposited in the MIB 8 of each network device.

The network management application 9 is part of an autodiscovery tool 11 which is capable of generating a relational data model 12 in which the SNMP-queryable device-related management information 10 is stored. The data is only momentarily stored in the relational data model 12 which has the function of a buffer. It is ascertained whether any of the currently measured electric power consumption values 21 are beyond a range of values (either too high or too low) since an untypical electric power consumption value of a network device could indicate a malfunctioning of the network device. If a currently measured electric power consumption 21 is beyond the range of values, an alarm is immediately raised by an alarm unit 19. The alarm unit 19 is also in contact with a data warehouse 13 in which current electric power consumption values 21 are stored for a longer period of time. If the alarm unit 19 recognizes that the last measured current electric power consumption of a network device strongly deviates from current electric power consumption values measured some time ago, it also raises an alarm to notify a data center administrator of a possible malfunctioning of a network device. After having verified whether an alarm should be raised, the data stored in the relational data model 12 is imported into the data warehouse 13 which is particularly suitable for evaluating the current electric power consumption values 21 gathered together over a period of time.

The collected current electric power consumption values 21 are further analyzed by a series of analysis tools. To this end, the data warehouse 13 is connected to a report unit 15 which compiles, on a regular basis, a report concerning the measured electric power consumption values 21. The data warehouse 13 is further connected to a spreadsheet unit 16 which enables the current electric power consumption values 21 of the network devices to be evaluated in a diagrammatic form. The total electric power consumption (i.e. the sum of all electric power consumption values of all network devices) or the minimal, maximal or average electric power consumption of a certain network device over time may be computed by means of the spreadsheet unit 16, but also current electric power consumption values relating to individual network devices may be ascertained. Furthermore, the data warehouse 13 is connected to an OLAP (Online Analytical Processing) unit 17, by means of which individual and aggregated data stored in the data warehouse 13 may be queried and analyzed in a user-friendly and fast way. A query may, for instance, ask for the electric power consumption value 21 of server 3.2 at 14:20 p.m. or for the last-measured current electric power consumption value 21 of interconnect device 4.3. In order to enable advanced analysis of the collected data, a data mining unit 18 is provided. The methods of data mining, include, for example, predictive methods such as neural network models, to predict a dynamically changing size of interest. In the present exemplary embodiment, the data mining unit 18 is deployed to foresee the electric power consumption of the IT network 1 by analyzing the collected current electric power consumption values 21.

The report unit 15, the spreadsheet unit 16, the OLAP unit 17 and the data mining unit 18 are connected to a graphical user interface 20 which transforms the results of the analysis tools into a graphical representation which may be displayed on a video display 33.

Figure 2A:
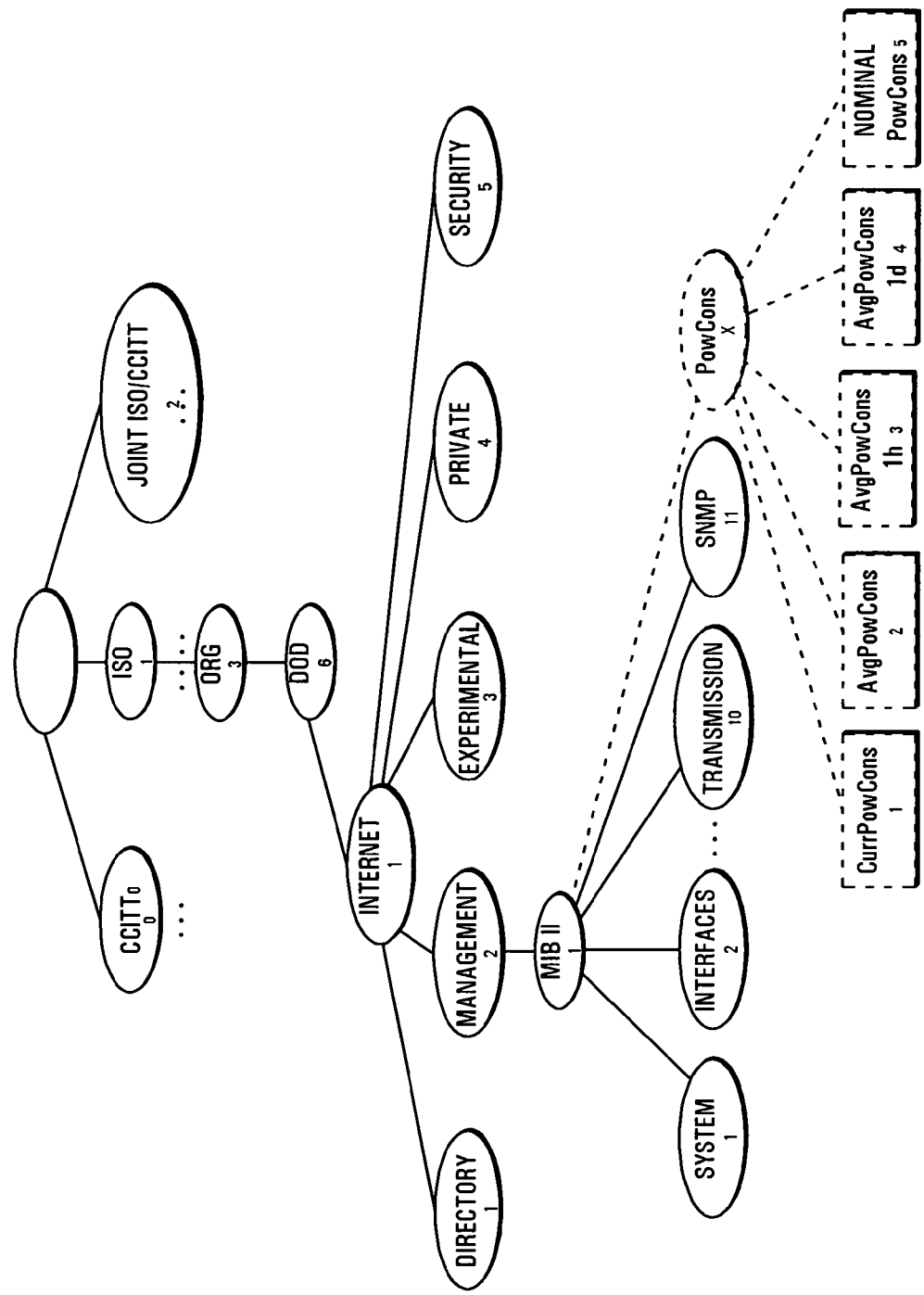
FIGS. 2a and b illustrate two exemplary ways of extending the standardized Internet registration tree, according to embodiments of the invention.

FIG. 2: Extended Internet Registration Tree:

FIG. 2a shows an extract of the hierarchical Internet registration tree. SNMP-queryable device-related management information 10 is deposited in the MIB 8 of each network device, whereby an MIB 8 is typically a simple ASCII file written in ASN.1 "Abstract Syntax Notation" which defines information objects and their contents. The SNMP-queryable device-related management information 10 is hierarchically organized in the form of a tree whose individual nodes are assigned numbers, whereby only leaf nodes, indicated as rectangular nodes, reference SNMP-queryable device-related management information 10. All other nodes, indicated as oval nodes, merely serve as directories. A path within the tree leading from the root to a leaf is represented by an OID (object identifier) which is a concatenation of the names (or numbers) assigned to the individual nodes (separated by dots) which are traversed in order to reach a certain leaf. Hence, each individual management information stored in a leaf of the tree is addressable via an OID.

On the uppermost level of the Internet registration tree, there are three nodes, each representing an organization responsible for the standardization of SNMP, so that currently three top-level nodes exist. The node pertaining to CCITT (Comité Consultatif International Téléphonique et Télégraphique) is assigned "0", the node referring to ISO (International Standard Organization) is assigned "1" and the node referring to joint work of CCITT and ISO is assigned "2". In the IETF standard RFC 1213, the OIDs standardized in SNMP are derived from the node "ISO", via the intermediate levels "ORG" (organizations), "DOD" (department of defense) and "Internet". The part of the Internet registration tree below "Internet" represents the least common denominator of all SNMP implementations, and all these OIDs start with 1.3.6.2.1. The Internet registration tree provides, for instance, access to the management information iso.org.dod.internet.mgmt.mib-2.system.SysUpTime, which is equally accessible via the numerical series 1.3.6.1.2.1.1.3.

Beneath node "management", there is a node "MIB II". Since SNMPv1 (version 1) and its associated MIB (MIB I) data structure could not satisfy many wishes of users, it was decided to extend MIB I with the release of SNMPv2 (RFC 1450). The extension of MIB I, called MIB II, was directly integrated into the existing data structure MIB I below the node "management".

In the Internet registration tree, there exists a node (directory), which is provided for enterprises (iso.org.dod.internet.private.enterprises, or 1.3.6.1.4.1) where SNMP-queryable management information which is specific for network devices of a certain enterprise can be stored. As is done for IP addresses, the IANA (Internet Assigned Numbers Authority) assigns number domains, e.g. management information concerning CISCO network devices have OIDs starting with 1.3.6.1.4.1.9.

On the group-level, which is the penultimate level, there are currently ten nodes provided. A further node is added which is referred to as "PowCons" and has the OID 1.3.6.1.2.1.x, where x denotes an unused MIB subtree, which is not yet defined in the standardized Internet registration tree. This node represents a directory for management information concerning electric power consumption and has five leaf nodes storing SNMP-queryable electric power consumption values. The following table gives an overview of the electric power consumption values accessible within this group:

| OID of leaf node | Name | Description |
| --- | --- | --- |
| 1.3.6.1.2.1.x.1 | CurrPowCons | Currently measured electric power consumption (electric power meter required) |
| 1.3.6.1.2.1.x.2 | AvgPowCons | Average electric power consumption of all measured electric power consumption values (electric power meter required) |
| 1.3.6.1.2.1.x.3 | AvgPowCons1 h | Average electric power consumption of all measured electric power consumption values during the last hour (electric power meter required) |
| 1.3.6.1.2.1.x.4 | AvgPowCons1d | Average electric power consumption of all measured electric power consumption values during the last day (electric power meter required). |
| 1.3.6.1.2.1.x.5 | NominalPowCons | Nominal electric power consumption, determined by manufacturer (no electric power meter required). |

It should be mentioned that several electric power consumption values can be deposited at the same time in the subtree. However, not all electric power consumption values are available in all network devices. For example, if a network device does not feature an electric power sensor, then the first four values shown in the table above are not available since they require the measurement of electric power consumption values. Furthermore, also the nominal electric power consumption is not available in the MIB if the manufacturer of the device does not provide the nominal electric power consumption value.

The data structure shown in FIG. 2a is the standardized Internet registration tree which is extended, according to embodiments of the invention, in such a way that it further contains a group node referenced by OID 1.3.6.1.2.x, named "PowCons", which offers an appropriate directory within the Internet registration tree for data about storing electric power consumption of a network device. If, for example, the network management application 9 queries the current electric power consumption 21.2 of server 3.2, this is achieved via the command snmpget server2.public.iso.org.dot.internet.mngt.mib-2.PowCons.CurrPowCons.0. Since, at present, there are in fact no leaves in the Internet registration tree provided for storing the electric power consumption data of a network device, the nodes are hypothetical and are therefore indicated in dashed lines.

Figure 2B:
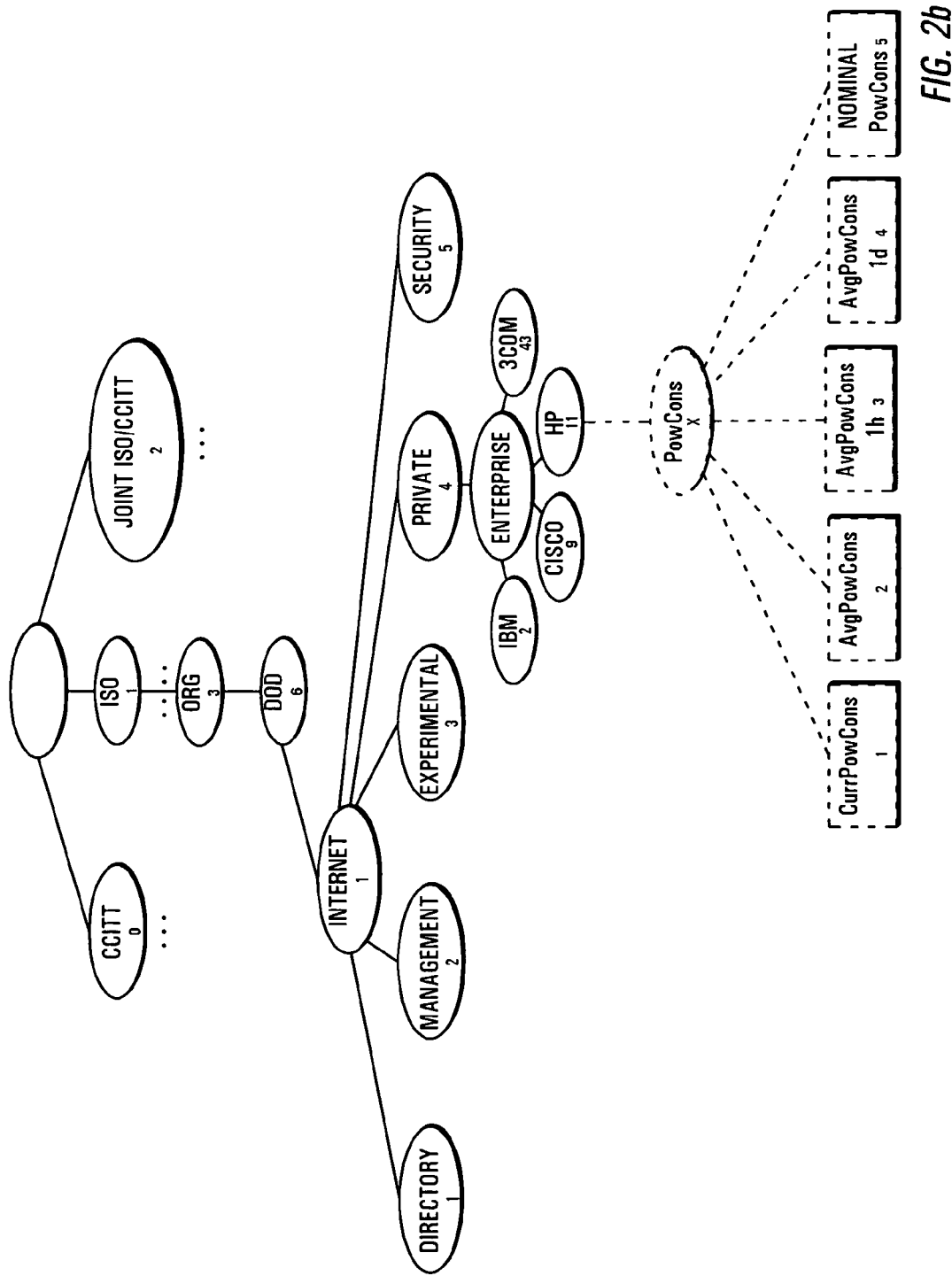

FIG. 2b shows an alternative way of extending the standardized Internet registration tree (as defined in RFC 1213). As mentioned above, the Internet registration tree is extensible in that it provides a node "Enterprise" in which enterprises are enabled to customize the Internet registration tree according to their wishes. Below this node and the node "Hewlett Packard", the data structure as shown in FIG. 2b is extended by a group-node "PowCons" which references electric power consumption. Instead of integrating the "PowCons" node into the general part of the Internet registration tree by running through a standardization process, a group-node "PowCons" within the "Hewlett Packard" section of the Internet registration tree is requested at the IANA (which should be a less time-consuming approach). Extending the standardized Internet registration tree within the "Enterprise" subtree could therefore be done as long as the standardization process mentioned in the description of FIG. 2a has not been finished. It should be mentioned that a standardization is advantageous in that the electric power consumption of all devices, regardless of their manufacturer, can then be requested in a uniform manner.

FIG. 3: Relational Data Table in Accordance with the Architecture FIG. 1:

FIG. 3 shows a relational data table which is part of the entire relational data model 12. The relational data model 12 contains SNMP-queryable device-related management information 10 which has been collected by the management application 9. The relational data table shown in FIG. 3 contains parts of the SNMP-queryable device-related management information 10 which has been collected by the network management application 9 and which is enlisted into the relational data table by the autodiscovery tool 11. The relational data table contains attributes such as device id 24 (a number which uniquely identifies a device), manufacturer 25, date 26 and time 27 (timestamp indicating time of measurement) and the current electric power consumption 21 at the point of time indicated by the timestamp. The first five entries of the table refer to the servers 3.1-3.5 of the IT network 1 shown in FIG. 1, whereas the following five entries refer to the interconnect devices 4.1-4.5 of the IT network 1 of FIG. 1.

Figures 4A, 4B:
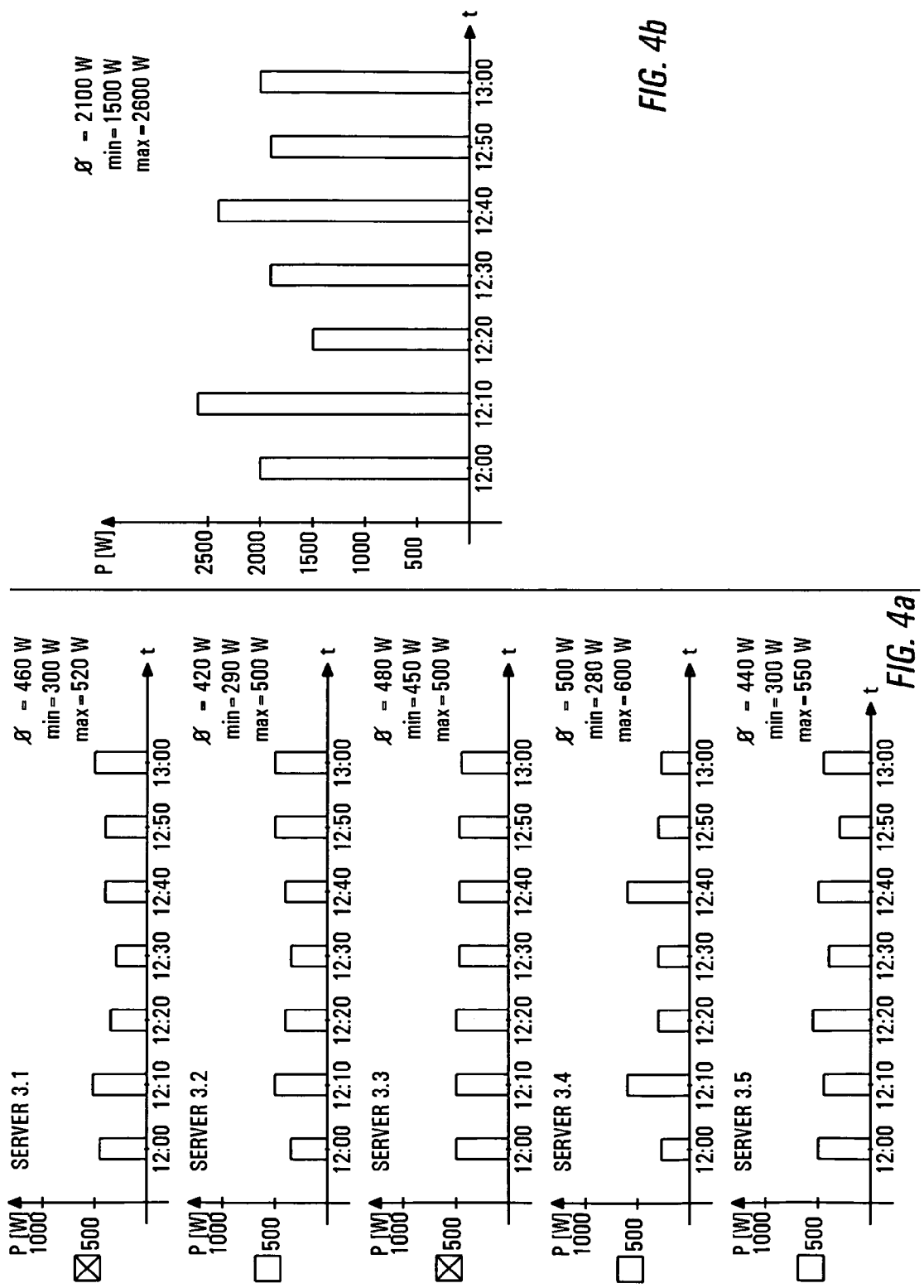

FIG. 4: Graphical Evaluation of Current Electric Power Consumption Values:

FIG. 4a shows measured electric power consumption values of the servers 3.1-3.5 over one hour, from 12:00 to 13:00, as evaluated by the spreadsheet unit 16. Listed on the right of each diagram, the average electric power consumption value of the corresponding server 3 is indicated. Furthermore, the minimal and maximal electric power consumption values of each server 3.1-3.5 are specified. To the left of each diagram, an icon is provided which enables the user to select the corresponding server 3 for calculating the electric power consumption of a part of the servers 3. In the example, server 3.1 and server 3.3 have been selected.

FIG. 4b shows the total electric power consumption of the servers 3.1-3.5 (i.e. the sum of all consumption values of the servers 3.1-3.5). Moreover, the average, minimal and maximal electric power consumption values of the servers are indicated.

FIG. 4c shows the measured electric power consumption values of the interconnect devices 4.1-4.5 over a period of time, as evaluated by the spreadsheet unit 16. Listed on the right of each diagram, the average electric power consumption value of the corresponding interconnect device 4 is indicated. Furthermore, the average, minimal and maximal electric power consumption values of each interconnect device 4.1-4.5 are specified. To the left of each diagram, an icon is provided which enables the user to select the corresponding interconnect device 4 for calculating the electric power consumption of a part of the interconnect devices 4. In the example, interconnect device 4.4 and 4.5 have been selected FIG. 4d shows the total electric power consumption of the interconnect devices 4.1-4.5 (i.e. the sum of all consumption values of the interconnect devices 4.1-4.5) and the average, minimal and maximal electric power consumption values.

Figures 4E, 4F:
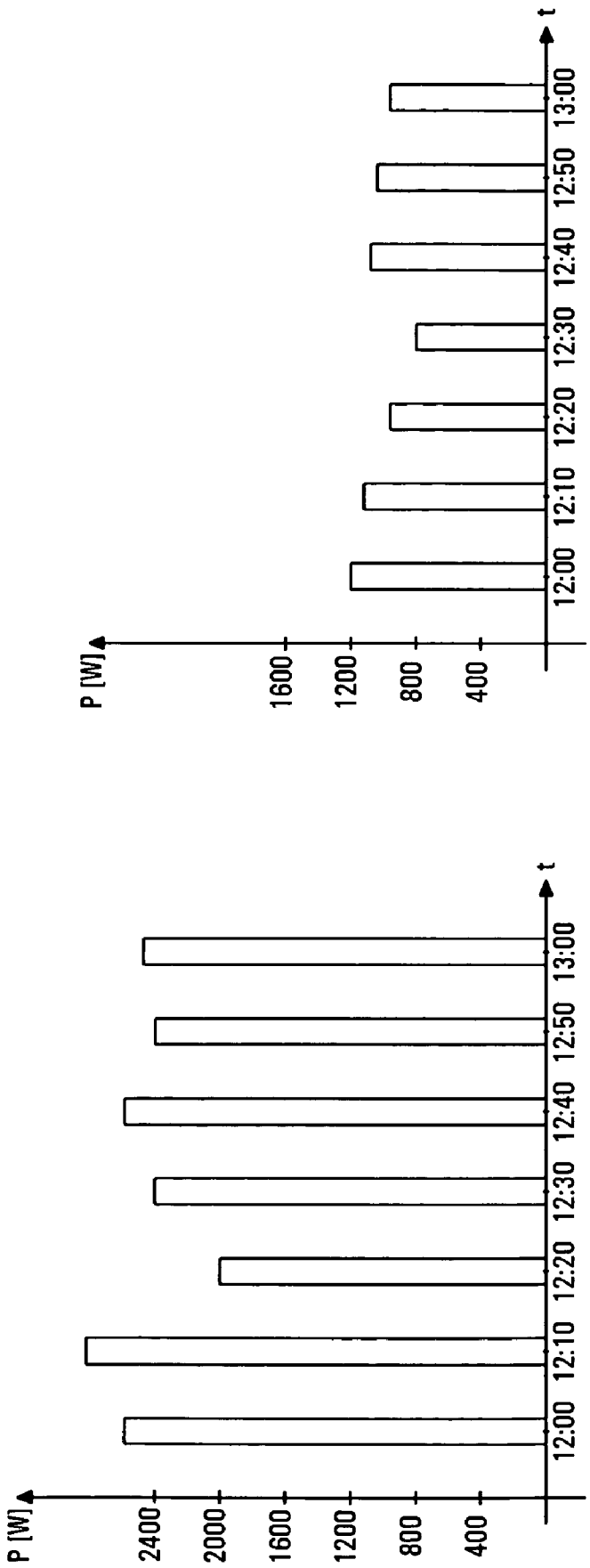

FIG. 4e shows the total electric power consumption of the IT network 1 (i.e. the sum of all consumption values of all servers 3.1-3.5 and all interconnect devices 4.1-4.5).

FIG. 4f shows that also information concerning parts of the IT network 1 may be determined. It is assumed that the servers 3.1, 3.3 and the interconnect devices 4.4, 4.5 are located in a first room, while the other network devices are located in a second room. If a data center administrator wants to query the total electric power consumption of the network devices located in the first room, s/he may click on the icons displayed on the left of the diagrams indicating electric power consumption of network devices, as shown in FIGS. 4a and c, to select the corresponding network devices. In the given embodiment, the user wants to determine the electric power consumption of the network devices located in the first room. Therefore, s/he has selected servers 3.1, 3.3 (see FIG. 4a) and interconnect devices 4.4, 4.5 (see FIG. 4c). FIG. 4f shows a diagram indicating the total electric power consumption of the network devices located in the first room from 12:00 to 13:00.

Figure 5:
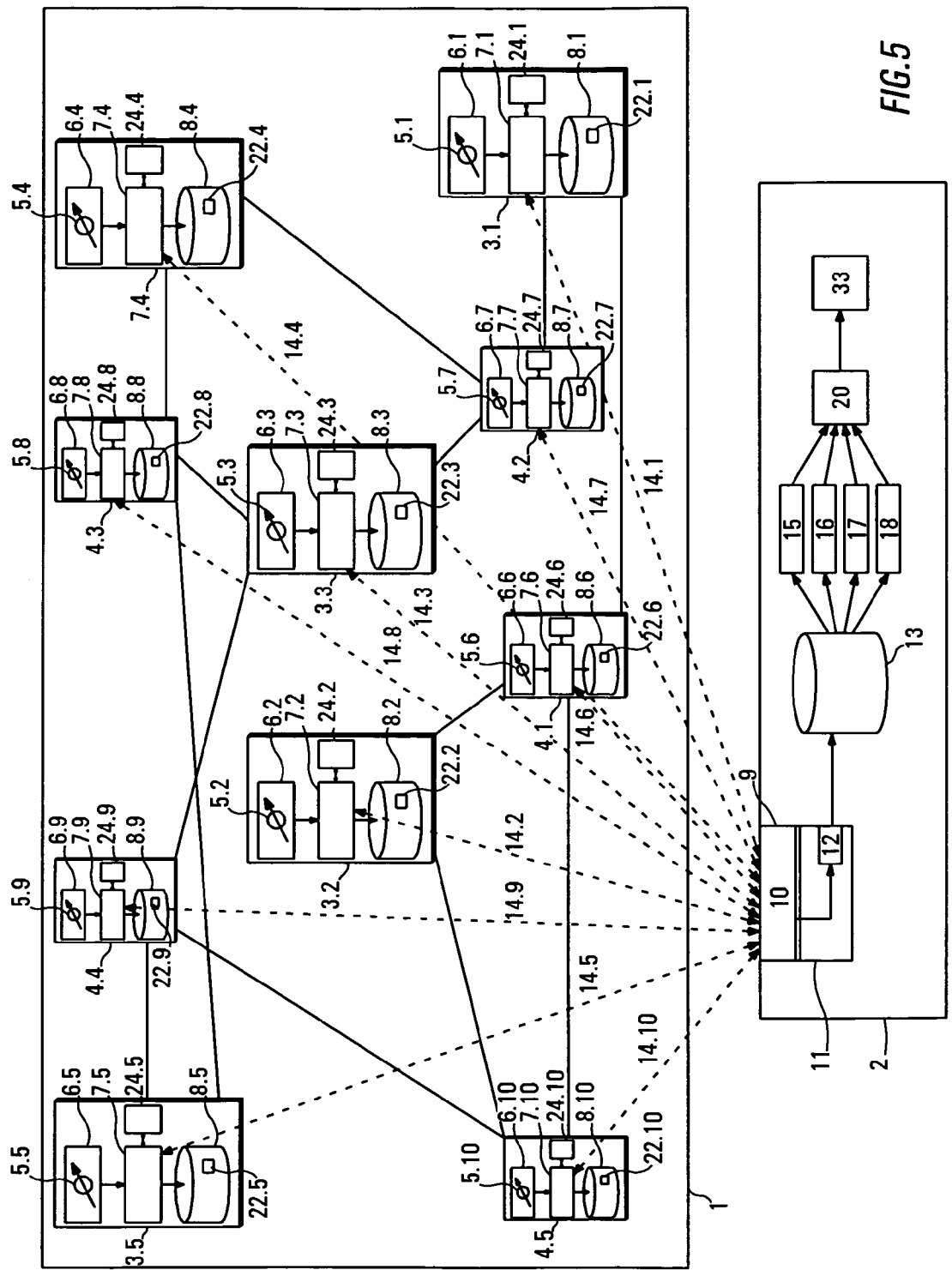
FIG. 5 is a high-level architecture of another exemplary management station and exemplary IT network for determining current electric power consumptions and calculating nominal values thereof, according to embodiments of the invention.

FIG. 5: Architecture on the Basis of Determining Current Electric Power Consumptions and Calculating Nominal Values Thereof:

FIG. 5 refers to a modification of the embodiment of FIG. 1. In the embodiment of FIG. 5, the electric power consumption values deposited in the MIBs 8 are current electric power consumption values 21, which are permanently updated by SNMP agents 7. Furthermore, ten current electric power consumption values 21 are measured at ten different points of time determined by the user, the ten current electric power consumption values are stored in a memory 24 of each network device and an average electric power consumption value is calculated from the ten current electric power consumption values 21 which are stored in the MIBs 8 of each corresponding network device. In this embodiment, the electric power consumption value calculated from the ten measured electric power consumption values does not dynamically change but is a nominal electric power consumption value 22. Therefore, the electric power consumption determined from the ten current electric power consumption values, is stored in the MIB data structure in the leaf node "NominalPowCons" (OID 1.3.6.1.2.1.x.5). Determining a nominal electric power consumption value in this way is performed if the manufacturer has not indicated any nominal power consumption value of a device. The average calculation is done to get typical nominal electric power consumption values of the network devices. In some cases, if a user wants to determine the total electric power consumption of the IT network 1, s/he may not be interested in the current electric power consumption but in an average total electric power consumption. If a user queries the current electric power consumption values at a certain point of time to receive an impression of the electric power consumption of the queried network device, the queried current electric power consumption values may not be characteristic. Hence, to get typical electric power consumption values, an average value is calculated from the ten electric power consumption values which are measured at different points. Then, in each server 3, the calculated average value is set by an SNMP agent 7 at an appropriate position within the extended Internet registration tree as shown in FIGS. 2a and b.

FIG. 6: Relational Data Table in Accordance with the Architecture of FIG. 5:

FIG. 6 shows a relational data table in accordance with the architecture of FIG. 5. Since the nominal electric power consumption values 22 stored in the table are time-invariant, the point of time when the nominal electric power consumption is requested is circumstantial. Therefore, no column for storing the point of time when the data has been requested is provided. The table contains SNMP-queryable management information 10 such as the device id, the name of the manufacturer and the nominal electric power consumption of the corresponding network device.

FIG. 7: Graphical Evaluation of Nominal Electric Power Consumption Values in Accordance with the Architecture of FIG. 5:

FIG. 7a shows nominal electric power consumption values 22 of the servers 3 of the IT network shown in FIG. 5. Listed on the right of the diagram, the average electric power consumption, the minimal and the maximal electric power consumption are indicated. Below the diagram, icons are provided for selecting some (or all) of the servers 3.

FIG. 7b shows the nominal electric power consumption values 22 of the interconnect devices 4. The average, minimal and maximal values are also indicated. Below the diagram, icons are provided for some (or all) of the interconnect devices 4.

FIG. 7c shows a diagram indicating the total electric power consumption of the IT network 1.

By clicking on the icons below the nominal electric power consumption values of servers 3 and interconnect devices 4, shown in FIGS. 7a and b, a user may select a subset of network devices whose nominal electric power consumption s/he wants to calculate. In the present example, the user has selected server 3.1 and 3.2 and the interconnect devices 4.1 and 4.2. The right-hand bar in the diagram of FIG. 7c shows the total electric power consumption of the selected network devices. Besides calculating the average, minimal and maximal electric power consumption values, there are still other statistical evaluations conceivable such as median, variance etc.

Figure 8:
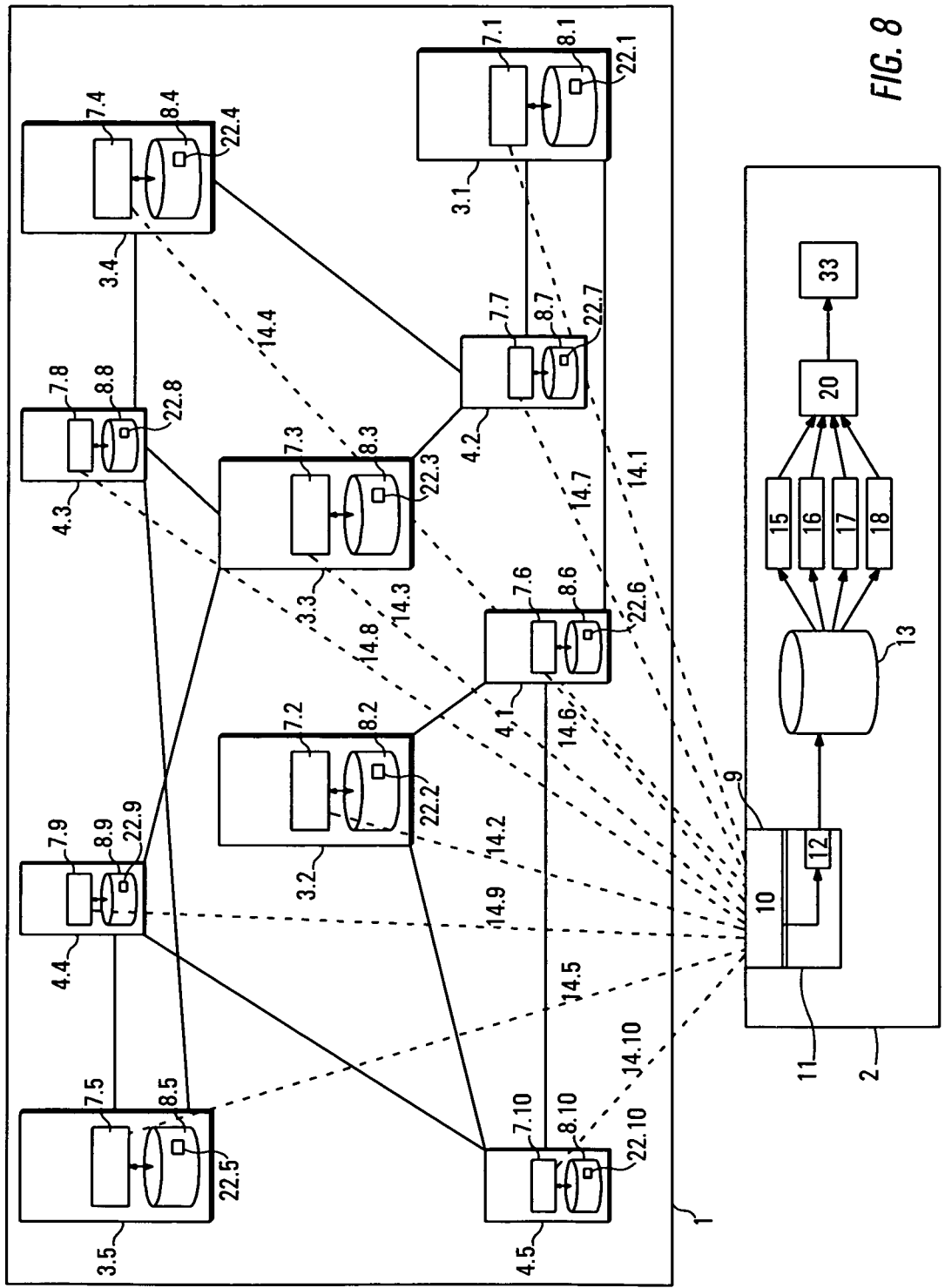
FIG. 8 is a high-level architecture of an exemplary management station and an exemplary IT network for determining nominal electric power consumptions, according to embodiments of the invention.

FIG. 8: Architecture on the Basis of Nominal Electric Power Consumptions:

Contrary to the architectures of FIGS. 1 and 5, the architecture of FIG. 8 illustrates an exemplary embodiment in which no electric power meters 5 are provided. Instead, a nominal electric power consumption 22 of each network device is determined once, after its manufacturing, and is inserted into the MIB 8 of each network device. Therefore, the electric power meters 5, as shown in FIG. 1 and FIG. 5, are not necessary in this embodiment. Hence, the SNMP-queryable electric power consumption values of the network devices are fixed (nominal) values typically indicating an average value calculated from several electric power measurements done by the manufacturer. Therefore, the electric power consumption values CurrPowCons, AvgPowCons, AvgPowCons1h and AvgPow1d, which require an electric power meter 5, are not available via the MIBs 8 of the network devices.

It should be mentioned that requesting the electric power consumption values as shown by means of FIGS. 5 and 8 differs from requesting power consumption values as shown in FIG. 1, in that in the architectures of FIGS. 5 and 8 only nominal electric power consumption values are available when querying a network device, whereas in the architecture of FIG. 1, the current electric power consumption value, the average power consumption, the average power consumption of the last hour which may be dynamically changing, are available. (Additionally, also a nominal electric power consumption may be returned in the architecture of FIG. 1 if provided by the manufacturer.)

The collected SNMP-queryable device-related data (which includes the nominal electric power consumption values 22) is inserted into a relational data table of the relational data model 12. The data is then transferred to the data warehouse 13 for further processing. Furthermore, it is pointed out that in the present embodiment, even though the queryable nominal electric power consumption values 22 are constant, the actual electric power consumptions of the network devices do indeed alter. However, since there are no power meters installed in the network devices, this change is not measured and the altering electric power consumption values are not updated in the MIBs 8. Instead, a nominal electric power consumption value is laid down once in the MIB 8 of each network device. Therefore, the evaluations subsequently made by one of the analysis tools only refer to time-invariant calculations such as calculating the average electric power consumption over all network devices (see FIG. 7). In the present example, an alarm unit is not provided since it would only be reasonable for dynamically changing electric power consumption values which reflect the current situation of the IT network 1.

Figure 9:
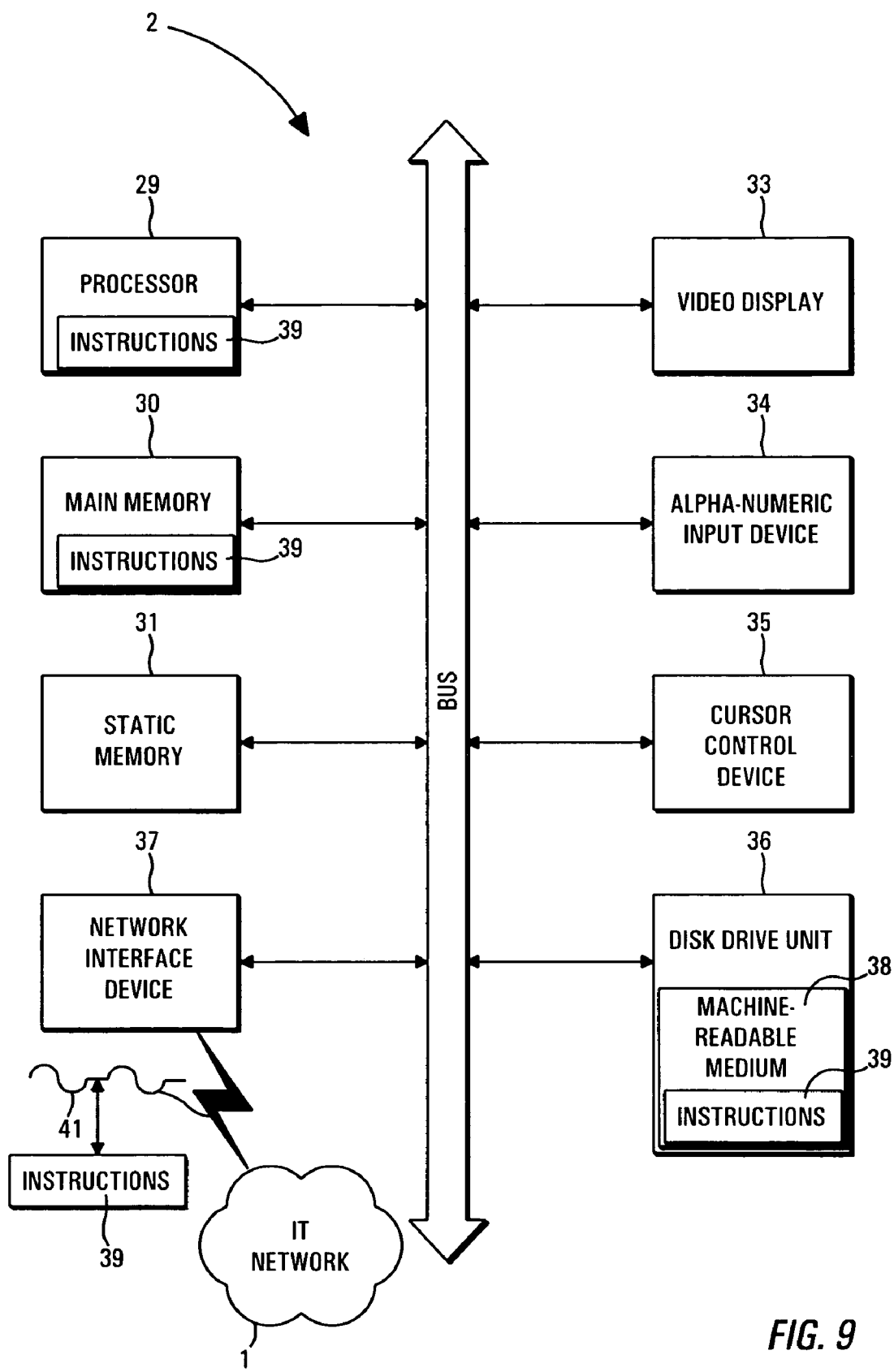
FIG. 9 is a diagrammatic representation of an embodiment of a network management station computer system.

FIG. 9: Computer System:

FIG. 9 is a diagrammatic representation of a computer system which provides the functionality of the network management station 2 of FIGS. 1, 5 and 8, and is therefore denoted as network management computer system 2. Within the network management computer system 2 a set of instructions, to cause the computer system to perform any of the methodologies discussed herein, may be executed. The network management computer system includes a processor 29, a main memory 30 and a network interface device 37, which communicate with each other via a bus 32. Optionally, it may further include a static memory 31 and a disk drive unit 36. A video display 33, an alpha-numeric input device 34 and a cursor control device 35 may form a management user interface. The network interface device 37 connects the network management computer system 1 to the IT network 1. A set of instructions (i.e. software) 39 embodying any one, or all, of the methodologies described above, resides completely, or at least partially in or on a machine-readable medium, e.g. the main memory 30 and/or the processor 29. A machine-readable medium on which the software 39 resides may also be a data carrier (e.g. a non-removable magnetic hard disk or an optical or magnetic removable disk) which is part of disk drive unit 36. The software may further be transmitted or received as a propagated signal 41 via the Internet and the IT network through the network interface device 37.

Thus, the described embodiments for determining electric power consumption in IT networks request electric power consumptions of the network devices directly from the network devices.

All publications and existing systems mentioned in this specification are herein incorporated by references.

Although certain methods and products constructed in accordance with the teachings of the invention have been described therein, the scope of coverage of this patent is not limited thereto. On the contrary, this patents covers all embodiments of the teachings of the invention fairly falling within the scope of the appended claims either literally or under the doctrine of equivalents.

What is claimed is:

1. A method of determining power consumption of a managed information technology (IT) network comprising network devices having a management-addressable address, the method comprising:
    running an autodiscovery tool to discover the network devices of the managed IT network;
    directing management requests to the management-addressable addresses of the network devices to obtain the electric power consumption values of the network devices;
    centrally collecting the electric power consumption values returned by the network devices;
    determining whether the collected power consumption value for one of the network devices is beyond a low value or beyond a high value; and
    triggering an alarm if the collected power consumption value is beyond the low value or beyond the high value.

2. The method of claim 1, wherein the electric power consumption of each network device is a current electric power consumption measured by a sensor.

3. The method of claim 1, further comprising:
    calculating a total electric power consumption of the managed IT network by adding the electric power consumption values of the network devices, wherein the total electric power consumption is determined at different points of time and a statistical evaluation of the total electric power consumption values associated with the different points of time is performed.

4. The method of claim 1, wherein the electric power consumption value returned by a network device is a nominal electric power consumption value.

5. The method of claim 4, wherein the nominal electric power consumption value of a network device is determined by measuring the current electric power consumption of a device at different points of time and calculating an average thereof.

6. A computer system for determining total electric power consumption of a managed information technology (IT) network comprising network devices having a management-addressable address, the computer system being programmed to:
    run an autodiscovery tool to discover the network devices of the managed IT network;
    direct management requests to the management-addressable addresses of the network devices to obtain the electric power consumption values of the network devices;
    centrally collect the electric power consumption values returned by the network devices;
    determine whether the collected power consumption value for one of the network devices is beyond a low value or beyond a high value; and
    trigger an alarm if the collected power consumption value is beyond the low value or beyond the high value.

7. A computer program stored on a storage device, and when the computer program is executed on a computer system, the computer system performs a method of managing power consumption of a managed information technology (IT) network comprising network devices having a management-addressable address, the method comprising:
    running an autodiscovery tool to discover the network devices of the managed IT network;
    directing management requests to the management-addressable addresses of the network devices to obtain the electric power consumption values of the network devices;
    centrally collecting the electric power consumption values returned by the network devices;
    determining whether the collected power consumption value for one of the network devices is beyond a low value or beyond a high value; and
    triggering an alarm if the collected power consumption value is beyond the low value or beyond the high value.

8. The computer program of claim 7, wherein each of the network devices stores at least one power consumption value for the network device, and each network device is addressable in a hierarchy.

9. The computer program of claim 7, wherein the method further comprises:
    providing, in a hierarchical Internet registration, a group level including nodes addressable in the hierarchy, wherein non-leaf nodes in the group level represent directories for management information including the collected electric power consumption values, and providing leaf nodes below the group level representing the network devices.

10. The method of claim 1, further comprising:
    providing, in a hierarchical Internet registration, a group level including nodes addressable in the hierarchy, wherein non-leaf nodes in the group level represent directories for management information including the collected electric power consumption values, and providing leaf nodes below the group level representing the network devices.

11. The computer system of claim 6, further programmed to provide, in a hierarchical Internet registration, a group level including nodes addressable in the hierarchy, wherein non-leaf nodes in the group level represent directories for management information including the collected electric power consumption values, and provide leaf nodes below the group level representing the network devices.

* * * * *